(12) United States Patent
Zhu et al.

(10) Patent No.: US 7,800,921 B2
(45) Date of Patent: Sep. 21, 2010

(54) DC/DC CONVERTER

(75) Inventors: Lizhi Zhu, Canton, MI (US); Fred Flett, Bloomfield, MI (US); John M. Van Dyke, Plymouth, MI (US)

(73) Assignee: Continental Automotive Systems US, Inc., Auburn Hills ( * ) Notice: Subject to any disclaimer, the term of this patent is extended or adjusted under 35 U.S.C. 154(b) by 246 days.

(21) Appl. No.: 11/970,721

(22) Filed: Jan. 8, 2008

(65) Prior Publication Data

US 2008/0205089 A1 Aug. 28, 2008

Related U.S. Application Data

(60) Provisional application No. 60/883,981, filed on Jan. 8, 2007.

(51) Int. Cl.
*H02M 3/335* (2006.01)
*H05K 7/02* (2006.01)
*H05K 7/20* (2006.01)

(52) U.S. Cl. .................... 363/17; 363/141; 363/144; 361/730

(58) Field of Classification Search ................ 336/182, 336/183; 363/15, 17, 21.02, 98, 127, 132, 363/141, 144, 147; 361/729, 730
See application file for complete search history.

(56) References Cited

U.S. PATENT DOCUMENTS

| 5,485,350 | A | * | 1/1996 | Hecht et al. ................ 361/692 |
| 5,530,635 | A | * | 6/1996 | Yashiro ....................... 363/65 |
| 5,831,847 | A | * | 11/1998 | Love ........................... 363/141 |
| 6,185,111 | B1 | * | 2/2001 | Yoshida ...................... 363/17 |
| 7,324,354 | B2 | * | 1/2008 | Joshi et al. ................... 363/17 |
| 2002/0172061 | A1 | | 11/2002 | Phadke |
| 2003/0117760 | A1 | | 6/2003 | Meir |
| 2004/0145920 | A1 | | 7/2004 | Xu et al. |
| 2005/0083714 | A1 | | 4/2005 | Zhu et al. |
| 2005/0174737 | A1 | | 8/2005 | Meir |
| 2005/0270745 | A1 | | 12/2005 | Chen et al. |
| 2006/0007721 | A1 | * | 1/2006 | Rodriguez et al. .......... 363/146 |
| 2006/0109695 | A1 | | 5/2006 | Ren et al. |

FOREIGN PATENT DOCUMENTS

EP 1677410 7/2006

OTHER PUBLICATIONS

International Search Report and Written Opinion mailed on Jul. 21, 2008.

* cited by examiner

*Primary Examiner*—Jeffrey L Sterrett
*Assistant Examiner*—Fred E Finch, III

(57) ABSTRACT

Power converter system topologies comprise a DC/DC converter. The DC/DC converter includes a transformer coupling a high side to a low side. The high side may include an inverter bridge in the form of an inverter module and an inductor. The low side may include a rectifier in the form of a rectifier module and a pair of inductors. The transformer may take the form of a planar transformer.

18 Claims, 3 Drawing Sheets

DC/DC CONVERTER

REFERENCE TO RELATED APPLICATION

The application claims priority to U.S. Provisional Application No. 60/883,981 which was filed on Jan. 8, 2007.

BACKGROUND

1. Field

The present disclosure relates to power converters, for example direct current-to-direct current (DC/DC) converters.

2. Description of the Related Art

DC/DC converters are typically employed to step up and/or step down a voltage of direct current (DC) power. Conventional DC/DC converter design relies on technology from computer power supplies based on discrete devices with complex mechanical structures resulting in low power density, low reliability and high assembly cost.

BRIEF SUMMARY

This disclosure presents a low cost, high power density and high reliability DC/DC converter that may be used, in one embodiment, in a hybrid electric vehicle application with simplified winding structure, reduced rectifier switch numbers, reduced ripple current on output capacitors, higher packing efficiency, higher switching frequency with lower EMI, high conversion efficiency with reduced number of devices in parallel, improved efficiency, improved long term durability, reduced lot-to-lot variation, better current sharing resulting in a lower operating temperature and constant parasitic loads.

BRIEF DESCRIPTION OF THE SEVERAL VIEWS OF THE DRAWING(S)

In the figures, identical reference numbers identify similar elements or acts. The sizes and relative positions of elements in the figures are not necessarily drawn to scale and some of these elements are arbitrarily enlarged and positioned to improve figure legibility. Further, the particular shapes of the elements as drawn are not intended to convey any information regarding the actual shape of the particular elements, and have been solely selected for ease of recognition in the figures.

DETAILED DESCRIPTION

In the following description, certain specific details are set forth in order to provide a thorough understanding of various embodiments of the present systems and methods. However, one skilled in the relevant art will recognize that the present systems and methods may be practiced without one or more of these specific details, or with other methods, components, materials, etc. In other instances, well-known structures associated with converter systems and power sources, and associated methods and apparatus have not been shown or described in detail to avoid unnecessarily obscuring descriptions of the embodiments of the present systems and methods.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present systems and methods. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the claimed invention.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
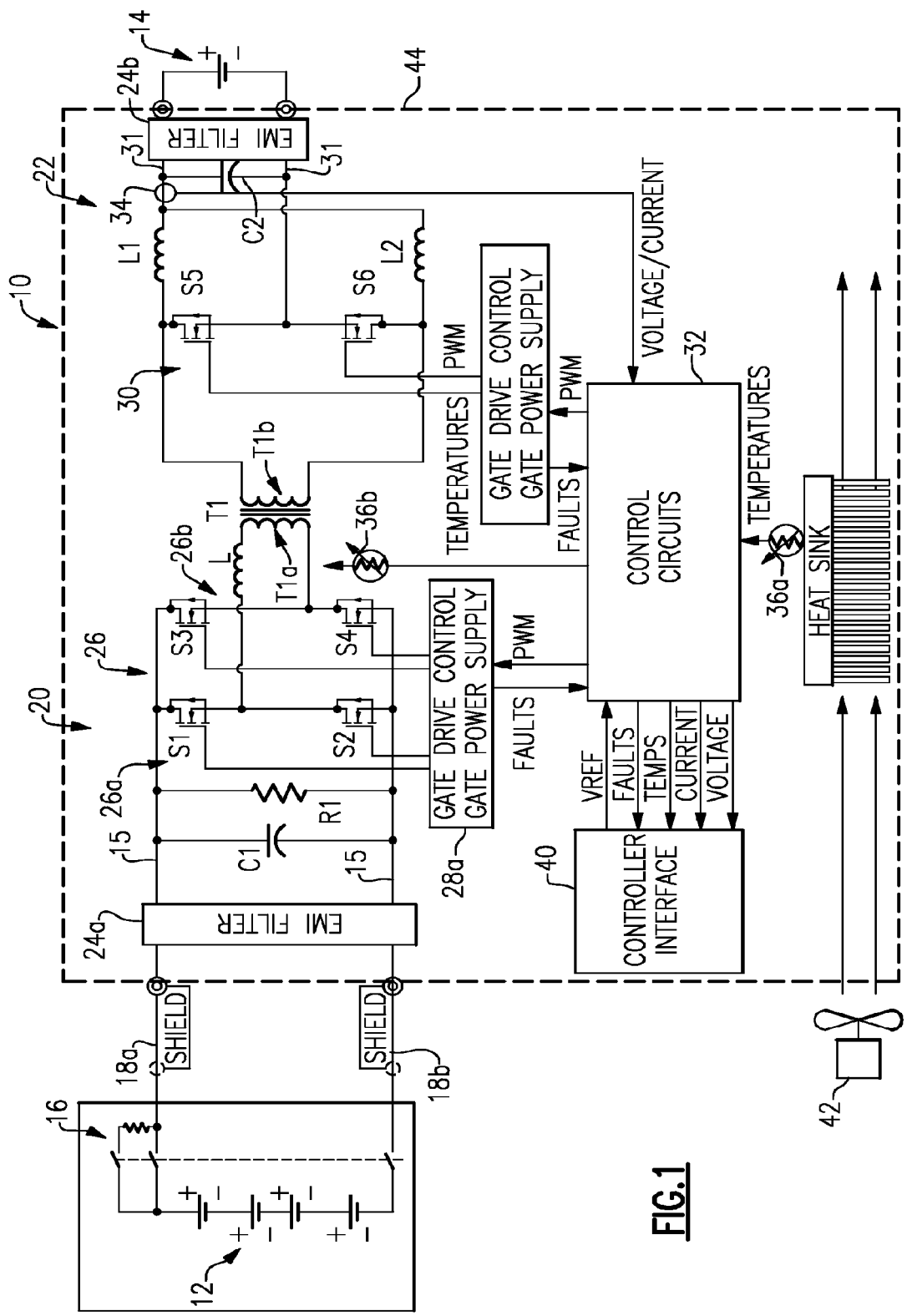
FIG. 1 is a schematic diagram of a DC/DC converter circuit including a high voltage side, a low voltage side and a transformer coupling the high and low voltage sides, according to one embodiment.

FIG. 1 shows a DC/DC power converter system 10 interfacing with a power source 12 and a load 14, according to one illustrated embodiment. The DC/DC power converter 10 is operable to convert a voltage of DC power. The DC/DC power converter 10 may be employed in a variety of applications, for example hybrid vehicle applications such as electric hybrid vehicles.

The power source 12 provides DC power and may take a variety of forms. For example, the power source 12 may take the form of one or more power storage devices, for instance one or more chemical battery cells and/or super- or ultra-capacitors, which may supply, as well as store, DC power. Additionally, or alternatively, the power source 12 may take the form of one or more power production devices, for example one or more fuel cells and/or supporting equipment (e.g. compressors, fans, blowers, reactant and oxidant supply systems, controllers), operable to produce DC power. The power source 12 may be electrically coupled to a high voltage bus 15 of the DC/DC power converter system 10 via one or more switches 16, for example one or more contactors or relays. The electrical connections may include suitable shields 18a, 18b.

The load 14 may take a variety of forms. For example, the load 14 may take the form of a low voltage (LV) bus, for instance an LV bus of a hybrid vehicle and/or associated equipment such as controllers, fans, etc.

The DC/DC converter system 10 includes a high voltage side 20, a low voltage side 22 and a transformer TI inductively coupling the high and low voltages sides 20, 22. The high and low voltage sides 20, 22 may each include respective electromagnetic interference (EMI) filters 24a, 24b at the interfaces to the power source 12 and load 14 to filter electromagnetic interference.

The high voltage side 20 includes an active inverter bridge 26 having a first leg 26a and second leg 26b coupled to respective poles of a primary side T1a of the transformer TI. The first leg 26a includes an upper switch S1 and a lower switch S2. The second leg 26b includes an upper switch S3 and a lower switch S4. The switches S1-S4 may take the form of metal oxide semiconductor field effect transistors (MOSFETs). Alternatively, or additionally the switches S1-S4 may take the form of insulated gate bipolar transistors (IGBTs). The active inverter bridge 26 may include a high voltage inductor L coupling the first leg 26a to the primary side T1a of the transformer TI. The high voltage side 20 may also include a high voltage capacitor C1 and resistor R1 coupled across the high voltage bus 15.

The switches S1-S4 are operated by signals provided by a high voltage side gate drive control and gate power supply 28a to invert DC power being supplied to the transformer TI from the power source 12.

The low voltage side 22 includes an active rectifier 30 coupled to a secondary side TI b of the transformer TI. The active rectifier 30 includes an upper switch S5 and upper low voltage inductor L1, and a lower switch S6 and low voltage inductor L2 inductor to implement current doubler rectification using synchronized rectification. The current on the secondary side TI b of the transformer TI is advantageously half of the load current. This allows the use of inductors L1, L2 each with half of the load current rating than would otherwise be required. Such may advantageously reduce parts cost due to the smaller size of the core wire gage. The use of two switches S5, S6 reduces parts and manufacturing costs, and may increase reliability. This approach also allows the total number of devices or dies in parallel to be reduced over conventional designs. The low voltage side 22 may include a low voltage capacitor C2 electrically coupled across a low voltage bus 31.

The switches S5-S6 are operated by signals provided by a low voltage side gate drive control and gate power supply 28b to rectify AC power from the transformer TI for supply to the load 14.

The DC/DC power converter 10 includes a one or more control circuits 32 that operatively interface with the high voltage side and low voltage side gate drive control and gate power supplies 28a, 28b. The one or more control circuits 32 may take a variety of forms, for example one or more controllers, microcontrollers, microprocessors, digital signal processors (DSPs), application specific integrated circuits (ASIC), field programmable gate arrays (FPGA), or the like, with or without associated memory.

In particular, the control circuit 32 provides control signals, for example pulse width modulated control signals to the gate drive control and gate power supplies 28a, 28b. Additionally, the control circuit 32 receives information from the gate drive control and gate power supplies 28a, 28b. For example, the control circuit 32 may receive one or more fault signals indicative of a fault occurring in the operation of the gate drive control and gate power supplies 28a, 28b, the active inverter bridge 26 or the active rectifier 30. The control circuit 32 may also receive other information. For example, the control circuit 32 may receive one or more signals indicative of a voltage and/or current on the low voltage bus, for example from one or more sensors 34, such a voltage or current sensors. Also for example, the control circuit 32 may receive one or more signals indicative of one or more temperatures. For instance, the control circuit 32 may receive signals from a first temperature sensor 36a indicative of a temperature of a heat sink 38 and/or from a second temperature sensor 36b indicative of a temperature of an ambient environment within the DC/DC power converter 10 or portion thereof such as the transformer T1.

The DC/DC power converter 10 may further include a controller interface 40 to provide communications with components other than those of the DC/DC power converter 10. The controller interface 40 may, for example, provide communications with a vehicle control system via a controller area network (CAN) bus. Additionally, or alternatively, the controller interface 40 may, for example, provide communications with a power source control system, for instance a fuel cell system controller.

In particular, the controller interface 40 may, for example, provide signals indicative of a desired reference voltage Vref to be provided on the low voltage bus 31. Additionally, or alternatively, the controller interface 40 may, for example, provide signals indicative of faults, temperatures, and/or actual currents and/or voltages.

The DC/DC power converter 10 may further include one or more fans, blowers or other devices 42 to transport heat from the heat sink 38. In some embodiments, the fans, blowers or other devices 42 may constitute one of the loads 14. A portion or all of the DC/DC power converter 10 may be housed within a main housing or converter module, represented by broken line 44.

Figure 2:
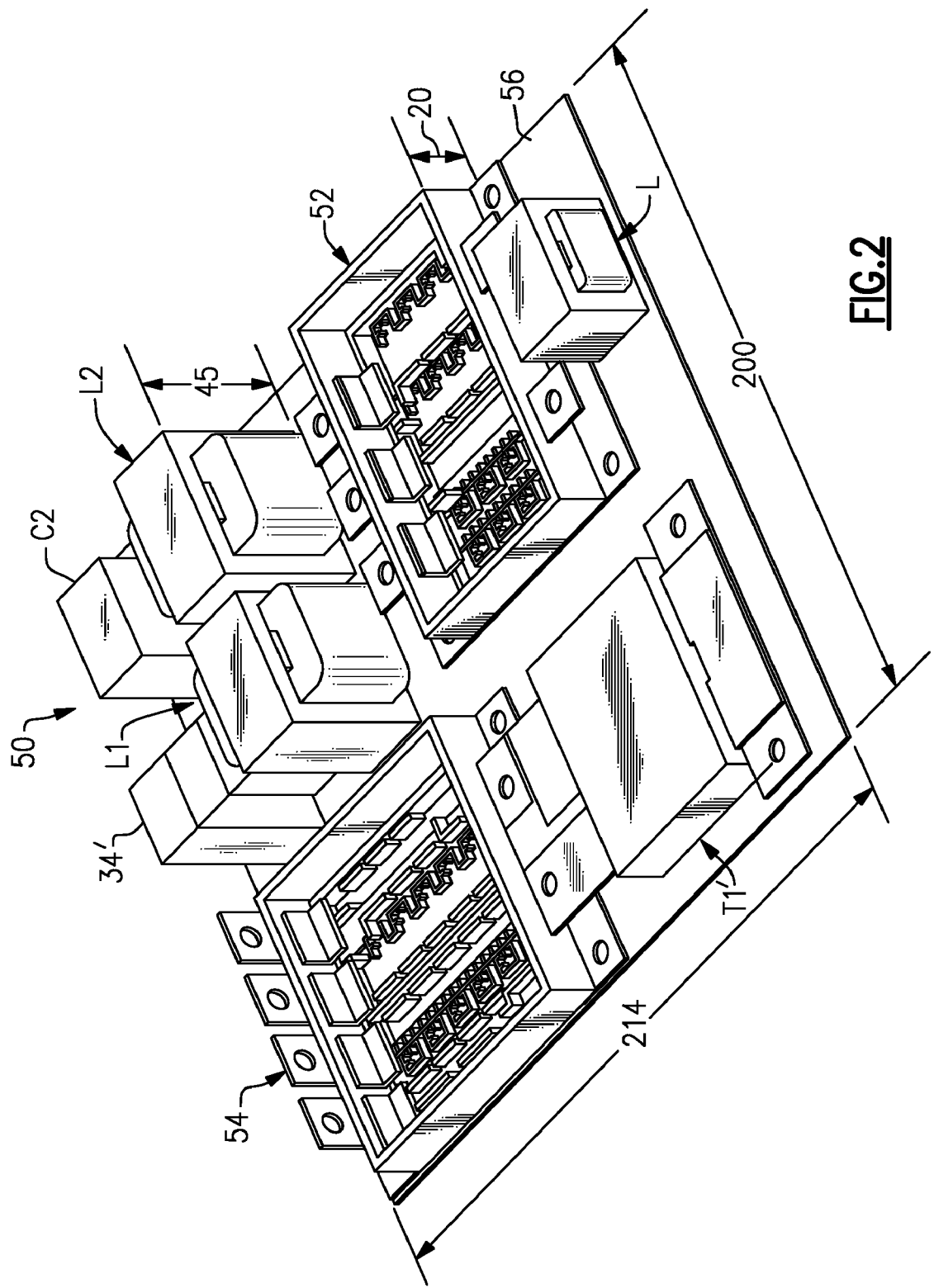
FIG. 2 is an isometric view of a DC/DC converter including an inverter module and inductor, a rectifier module and pair of inductors, and a planar transformer, according to one embodiment.

FIG. 2 shows a DC/DC power converter 10 formed as a power converter module 50.

The high voltage side 20 (FIG. 1) may be packaged as an inverter module 52 and high voltage inductor L. Likewise, the low voltage side 22 (FIG. 1) may be packaged as a rectifier module 54, low voltage inductors L1, L2, and low voltage capacitor C2. The transformer T1 (FIG. 1) may take the form of a planar transformer T1'. The planar transformer T1' simplifies the winding structure and provides a profile that is easily accommodated within a volume consistent with the heights of the other structures. The planar transformer T1' allows the use of PCB windings, may allow better cooling of the core and windings, and may provide a higher core window utilization ratio than convention transformer designs. Such may advantageously provide higher power density, lower profile, lower losses, better thermal performance and constant parasitic effects. The sensor 34 (FIG. 1) may be implemented using a current sensor module 34'.

The power converter module 50 may include a substrate, for example a base plate 56. The base plate 56 may carry the inverter module inverter 52, high voltage inductor L, rectifier 54, low voltage inductors L1, L2 and the planar transformer TI', as well as other components. The base plate 56 may form part of, or may be thermally coupled to the heat sink 38 (FIG. 1), to transfer heat from the inverter module 52, rectifier module 54, high voltage inductor L, low voltage inductors L1, L2, and/or planar transformer T1'. As best illustrated in FIG. 1, the heat sink 38 may include fins, pins or other structures for increasing the surface area of the heat sink. In some embodiments, the heat sink 38 may comprise a plate section and conduit section. The plate section may include a top surface having a pair of recesses sized and dimensioned to receive a portion of the magnetic core such as that of the planar transformer substrate T1' is flush with the surface. The conduit section comprises an inlet, an outlet and a passage formed by first passage section and second passage section which are fluidly coupled with the intake and outtake. The base plate 56 may include thermal radiating structures such as fins or pins on a surface opposed to the top surface which are received in the portions for transferring heat from the base plate 56 to a fluid passing through the conduit portions. The DC/DC power converter 10 may include a circulation system including, for example, a pump, compressor, and/or fan 42 (FIG. 1) for circulating fluid through the conduit portions to assist in transferring heat from the base plate 56. While shown as base plate 56, other embodiment may employ other forms of heat sinks.

While not illustrated, a cover may be coupled to the base plate 56 to form a housing therewith. The housing may insulate the various components of the DC/DC converter system 10 form the environment. For example, the housing may provide electrical protection, as well as protection from water or moisture, dirt 30 and/or grease.

Figure 3:
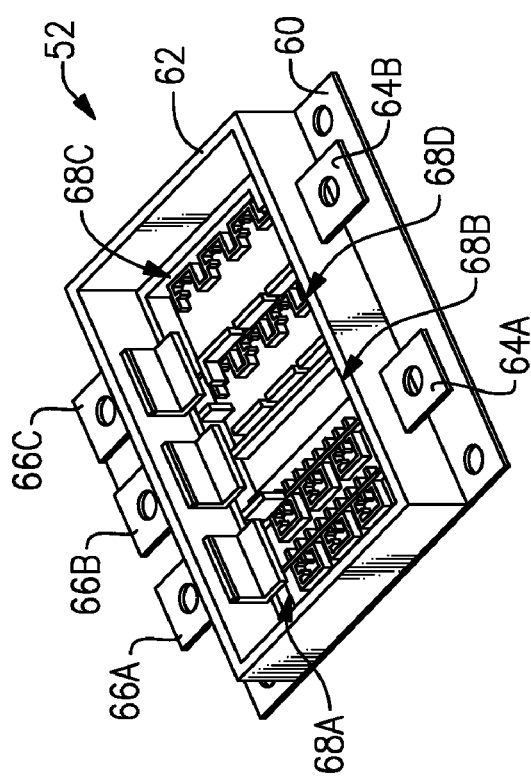
FIG. 3 is an isometric view of an inverter module, according to one embodiment.

FIG. 3 shows the inverter module 52, according to one illustrated embodiment.

The inverter module 52 includes a substrate 60 and a lead frame 62 extending from the substrate 60. The lead frame 62 may carry one or more terminals or leads to make electrical connections. As illustrated the lead frame 62 carries two leads 64a, 64b to couple to the power source 12 (FIG. 1) and three leads 66a, 66b, 66c to coupled to the high voltage inductor L and primary side T1a of the transformer TI (FIG. 1). The substrate 60 may take the form of one or more multi-layer substrates and may be attached to the base plate 56 via solder 10 reflow techniques.

The substrate 60 carries four sets of dice 68a, 68b, 68c, 68d, the dice in each set electrically coupled in parallel. Each set of dice 68a, 68b, 68c, 68d forms a respective one of the switches S1-S4 (FIG. 1) and anti-parallel diodes coupled across each switch S1-S4. As noted above, each die may, for example, take the form of a MOSFET or IGBT. The diodes may take the form of body diodes.

Figure 4:
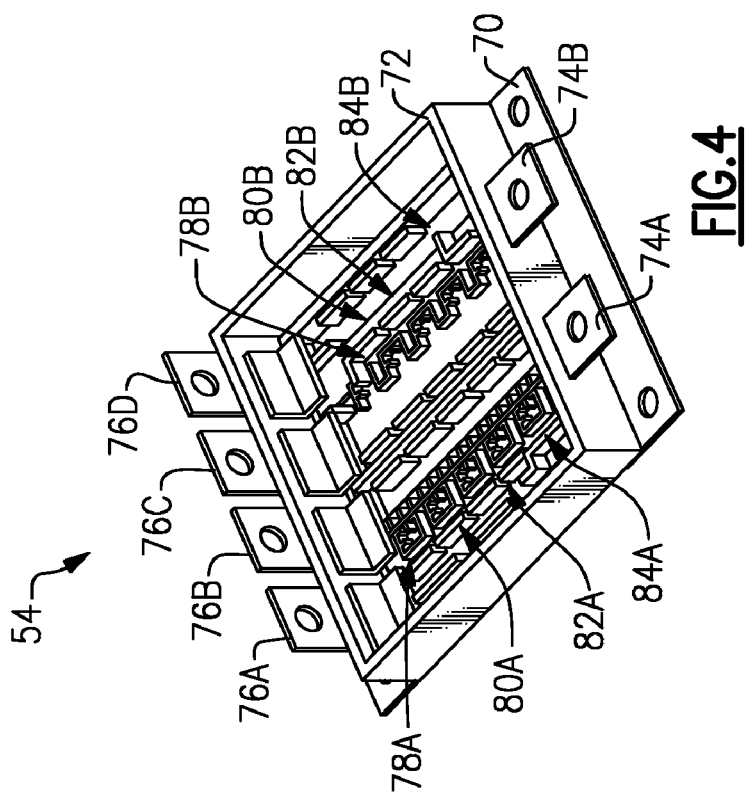
FIG. 4 is an isometric view of a rectifier module, according to one embodiment.

FIG. 4 shows the rectifier module 54, according to one illustrated embodiment.

The rectifier module 54 includes a substrate 70 and a lead frame 72 extending from the substrate 70. The lead frame 72 may carry one or more terminals or leads to make electrical connections. As illustrated the lead frame 72 carries two leads 74a, 74b to couple to the second side T1b of the transformer T1 and four leads 76a, 76b, 76c, 76d to couple to the low voltage inductors L1, L2 and the load 14 (FIG. 1). The substrate 70 may take the form of one or more multi-layer substrates and may be attached to the base plate 56 via solder reflow techniques.

The substrate carries two sets of dice 78a, 78b, the dice in each set electrically coupled in parallel. Each set of dice 78a, 78b forms a respective one of the switches S5, S6 (FIG. 1). As noted above, each die may, for example, take 30 the form of a MOSFET or IGBT. The substrate also carries two diodes 80a, 80b, two pairs of capacitors 82a, 82b and two gate resistors 84a, 84b. The gate resistors 84a, 84b are advantageously located within the housing or converter module 44.

The exposed leads 64a, 64b, 66a-66c, 74a, 74b, 76a-76d advantageously simplify the high current interconnections, reducing the need for wire bonding.

In operation, the gate drive control and gate power supply 28a supplies signals to switches S1-S4 to cause the active inverter bridge 26 to invert DC power to supply alternating power to the primary side T1a of the transformer T1. The gate drive control and gate power supplies 28b supplies signals to switches S5, S6 to rectify alternating power from the secondary side T1b of the transformer. Operation may employ zero voltage switching for some or all switches S1-S6, with phase shift control. The above structure and operation may advantageously reduce ripple current on the low voltage (output) capacitor C2. The above described structure may realize higher packing efficiency, higher switching frequency with lower EMI, and higher conversion efficiency than conventional converters.

The above described structure may realize improved long term durability, less lot-to-lot variation, better current sharing and cooler operation.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure. In at least one embodiment, the control circuit 32 maintains a commanded output voltage or current by varying the duty cycles of the power semiconductor switches of the DC/DC converter 10. In some embodiments, control may be coordinated among the control circuit 32 and other control systems, for example a fuel cell system controller (not shown) and/or an integrated power train controller (not shown).

In addition, those skilled in the art will appreciate that the control mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to:

U.S. patent application Ser. No. 10/360,832, filed Feb. 7, 2003 and entitled INTEGRATED TRACTION INVERTER MODULE AND DC/DC CONVERTER;

U.S. Pat. No. 6,573,682, issued Jun. 3, 2003;

U.S. patent publication Nos. 2003/0022038, 2003/0022036, 2003/0022040, 2003/0022041, 2003/0022042, 2003/0022037, 2003/0022031, 2003/0022050, and 2003/0022045, all published Jan. 30, 2003; 2003/0113594 and 2003/0113599, both published Jun. 19, 2003; 2004/0009380, published Jan. 15, 2004; 2004/0126635, published Jul. 1, 2004; and US-2006-0152085, published Jul. 13, 2006;

U.S. patent application Ser. Nos. 10/817,052, filed Apr. 2, 2004; 10/430,903, filed May 6, 2003; 10/440,512, filed May 16, 2003; 10/875,797 and 10/875,622, both filed Jun. 23, 2004; 10/138,926, filed Dec. 16, 2003; 10/664,808, filed Sep. 17, 2003; 10/964,000, filed Oct. 12, 2004, using Express Mail No. EV529821584US, and entitled "INTEGRATION OF PLANAR TRANSFORMER AND/OR PLANAR INDUCTOR WITH POWER SWITCHES IN POWER CONVERTER"; and 10/861,319, filed Jun. 4, 2004; and U.S. provisional patent application Ser. Nos. 60/569,218, filed May 7, 2004; 60/560,755, filed Jun. 4, 2004; and 60/621,012 filed Oct. 20, 2004, using Express Mail No. EV529821350US, and entitled "POWER SYSTEM METHOD AND APPARATUS"; are incorporated herein by reference, in their entirety. Aspects of the present systems and methods can be modified, if necessary, to employ systems, circuits and concepts of the various patents, applications and publications to provide yet further embodiments of the invention.

These and other changes can be made to the present systems and methods in light of the above-detailed description. In general, in the following claims, the terms used should not be construed to limit the invention to the specific embodiments disclosed in the specification and the claims, but should be construed to include all power systems and methods that read in accordance with the claims. Accordingly, the invention is not limited by the disclosure, but instead its scope is to be determined entirely by the following claims.

We claim:

1. A DC/DC power converter, comprising:
   a transformer for transforming power;
   an inverter for inverting DC power supplied from a power source and supplying the inverted power to a primary side of the transformer, the inverter supported with a first housing;
   a rectifier for rectifying power from a secondary side of the transformer to be supplied to a load, the rectifier supported within a second housing separate from the first housing; and
   a base plate supporting the transformer, the first housing and the second housing, wherein the transformer, the first housing and the second housing are all removably mounted to the base plate independent of each other.

2. The DC/DC power converter of claim 1 wherein the inverter includes an inverter bridge operable to invert power and a high voltage inductor.

3. The DC/DC power converter of claim 2 wherein the inverter bridge includes a first leg including at least one upper switch and one lower switch and a second leg including at least one upper switch and one lower switch.

4. The DC/DC power converter of claim 3 wherein the upper and lower switches are metal oxide semiconductor switches with diodes coupled across in anti-parallel.

5. The DC/DC power converter of claim 1 wherein the rectifier includes a first inductor and a first switch selectively coupling the first inductor to the secondary side of the transformer, and a second inductor and a second switch selectively coupling the second inductor to the second side of the transformer.

6. The DC/DC power converter of claim 1, further comprising:
   a first gate drive control and gate power supply coupled to control the inverter; and
   a second gate drive control and gate power supply coupled to control the rectifier.

7. The DC/DC power converter of claim 6, further comprising:
   a control circuit coupled to control the first and the second gate drive control and gate power supplies.

8. The DC/DC power converter of claim 7, further comprising:
   a control interface coupled to provide signals between the control circuit and at least one external component.

9. The DC/DC power converter of claim 1 wherein the transformer is a planar transformer.

10. The DC/DC power converter of claim 1 wherein the base plate includes at least one of fins or pins.

11. The DC/DC power converter of claim 10, further comprising:
    at least one temperature sensor positioned to sense a temperature at least proximate the base plate.

12. The DC/DC power converter of claim 1, further comprising:
    at least one temperature sensor positioned to sense an ambient temperature at least proximate the transformer.

13. The DC/DC power converter of claim 1, further comprising:
    at least one sensor coupled to detect at least one of a current or a voltage supplied by the rectifier.

14. The DC/DC power converter of claim 1, wherein the inverter is formed as an inverter module including a substrate and a lead frame disposed within the first housing, and wherein the rectifier is formed as a rectifier module including a substrate and a lead frame disposed within the second housing.

15. The DC/DC power converter as recited in claim 14, wherein each of the inverter module and the rectifier module include a substrate that is attached to the base plate by a solder bond.

16. The DC/DC power converter as recited in claim 15, wherein the substrate for the inverter module carries four sets of dice that are electrically coupled in parallel to form respective ones of four switches of the inverter module, and an anti-parallel diode disposed across each of the four switches.

17. The DC/DC power converter as recited in claim 15, wherein the substrate for the rectifier module carries two sets of dice that are electrically coupled in parallel to form respective ones of two switches.

18. The DC/DC power converter as recited in claim 1, wherein the transformer is a planar transformer that is recessed into an opening of the base plate.

* * * * *